United States Patent
Lai et al.

(10) Patent No.: US 8,570,288 B2
(45) Date of Patent: Oct. 29, 2013

(54) TOUCH PANEL HAVING LIGHT-SHIELDING LAYER

(75) Inventors: Chih-Chang Lai, Taichung County (TW); Shiao-Hui Liao, Taichung (TW); Yu-Hung Chang, Miaoli County (TW); Ping-Wen Huang, Taichung (TW); Ming-Kung Wu, Taichung County (TW); Hsiao-Ping Li, Taichung County (TW)

(73) Assignee: Wintek Corporation, Taichung (TW)

( * ) Notice: Subject to any disclaimer, the term of this patent is extended or adjusted under 35 U.S.C. 154(b) by 235 days.

(21) Appl. No.: 12/732,193

(22) Filed: Mar. 26, 2010

(65) Prior Publication Data

US 2011/0141034 A1 Jun. 16, 2011

(30) Foreign Application Priority Data

Dec. 14, 2009 (TW) ................................ 98142749 A

(51) Int. Cl.
*G06F 3/041* (2006.01)

(52) U.S. Cl.
USPC .......................................................... 345/173

(58) Field of Classification Search
USPC .................................................. 345/173–178
See application file for complete search history.

(56) References Cited

U.S. PATENT DOCUMENTS

| | | | | |
|---|---|---|---|---|
| 5,847,690 | A * | 12/1998 | Boie et al. ...................... | 345/104 |
| 2002/0180671 | A1 * | 12/2002 | Inukai .............................. | 345/76 |
| 2007/0242054 | A1 | 10/2007 | Chang et al. | |
| 2008/0264699 | A1 | 10/2008 | Chang et al. | |
| 2009/0236151 | A1 | 9/2009 | Yeh et al. | |
| 2010/0007627 | A1 * | 1/2010 | Lai et al. ....................... | 345/174 |
| 2010/0085326 | A1 * | 4/2010 | Anno ............................. | 345/174 |
| 2010/0164881 | A1 * | 7/2010 | Kuo et al. ...................... | 345/173 |

FOREIGN PATENT DOCUMENTS

| | | |
|---|---|---|
| TW | 200739401 | 10/2007 |
| TW | M329818 | 4/2008 |
| TW | 200836347 | 9/2008 |
| TW | 200842681 | 11/2008 |
| TW | M357659 | 5/2009 |
| TW | 200941305 | 10/2009 |
| TW | 200943160 | 10/2009 |
| TW | M368846 | 11/2009 |

OTHER PUBLICATIONS

"Office Action of Taiwan Counterpart Application", issued on Jan. 14, 2013, p. 1-p. 7.

* cited by examiner

*Primary Examiner* — Chanh Nguyen
*Assistant Examiner* — Sanghyuk Park
(74) *Attorney, Agent, or Firm* — Jianq Chyun IP Office

(57) ABSTRACT

A touch panel having a transparent region and a peripheral region surrounding the transparent region is provided. The touch panel includes a transparent cover, a touch device, a light-shielding layer, a layer of conductive lines, and a touch chip. The transparent cover has a touch surface and a device mounting surface opposite thereto. The touch device is disposed on the device mounting surface and at least located at the transparent region. The light-shielding layer is disposed on the transparent cover and located inside the peripheral region. The layer of conductive lines is disposed on the device mounting surface, located inside the peripheral region, and electrically connected to the touch device. The touch chip is disposed on the layer of conductive lines through a chip-on-glass process.

13 Claims, 6 Drawing Sheets

TOUCH PANEL HAVING LIGHT-SHIELDING LAYER

CROSS-REFERENCE TO RELATED APPLICATION

This application claims the priority benefit of Taiwan application serial No. 98142749, filed on Dec. 14, 2009. The entirety of the above-mentioned patent application is hereby incorporated by reference herein and made a part of this specification.

BACKGROUND OF THE INVENTION

1. Field of the Invention

The invention relates to a touch panel. More particularly, the invention relates to a touch panel having a light-shielding layer.

2. Description of Related Art

A conventional touch display panel includes a display panel, a touch panel disposed on the display panel, and a transparent cover disposed on the touch panel, wherein the transparent cover is used to protect the underlying touch panel and the display panel. A signal generated by an operation of a user is transmitted to a touch chip disposed on a flexible printed circuit board, and the touch chip analyses the signal to determine a position of the user's touch on the touch panel.

For transmitting the signals, a wiring region is configured at the peripheral region of the touch panel for disposing a plurality of conductive lines. When the touch panel is combined with the display panel, the transparent cover having a black ink layer is additionally used to prevent the exposition of the conductive lines inside the wiring region of the touch panel, wherein the black ink layer is usually disposed on the location corresponding to the wiring region of the transparent cover so as to cover the conductive lines. Accordingly, the invention is provided for reducing the layering structure of the touch panel so as to lower the manufacturing cost.

SUMMARY OF THE INVENTION

The invention is directed to a touch panel, wherein the conductive particles disposed between the touch chip and the conductive lines steadily connect the touch chip to the layer of conductive lines.

The invention is directed to a touch panel having a hard light-shielding layer to prevent from collapse.

The invention provides a touch panel having a transparent region and a peripheral region surrounding the transparent region and including a transparent cover, a touch device, a light-shielding layer, a layer of conductive lines, and a touch chip. The transparent cover has a touch surface and a device mounting surface opposite thereto. The touch device is disposed on the device mounting surface and at least located at the transparent region. The light-shielding layer is disposed on the transparent cover and located inside the peripheral region. The layer of conductive lines is disposed on the device mounting surface, located inside the peripheral region, and electrically connected to the touch device. The touch chip is disposed on the layer of conductive lines through a chip-on-glass process.

In view of the above, the invention facilitates the enhancement of the reliance of the connection between the touch chip and the layer of the conductive lines in the chip-on-glass process through thinning the thickness of the light-shielding layer or increasing the hardness of the light-shielding layer.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
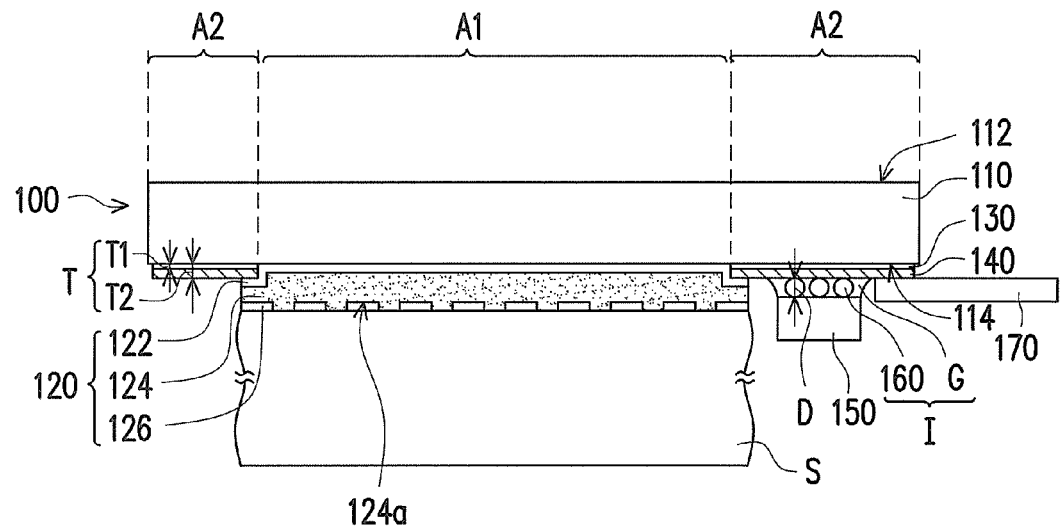
FIG. 1A illustrates a cross-sectional view showing a touch panel disposed on a display panel according to an embodiment of the invention.
Figure 1B:
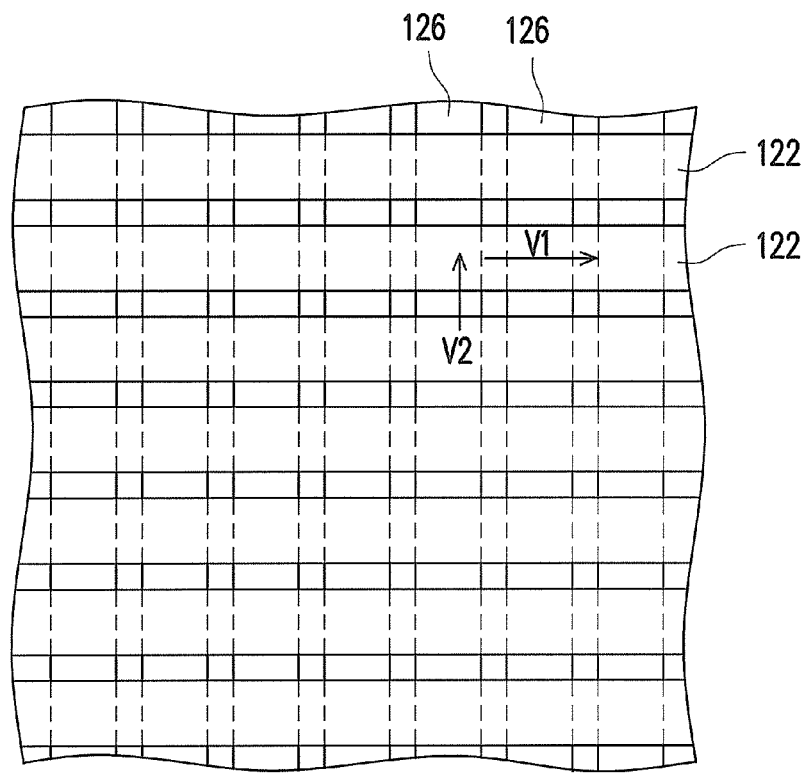
FIG. 1B illustrates a partial top view of the transparent region of the touch panel in FIG. 1A.
Figure 2A:
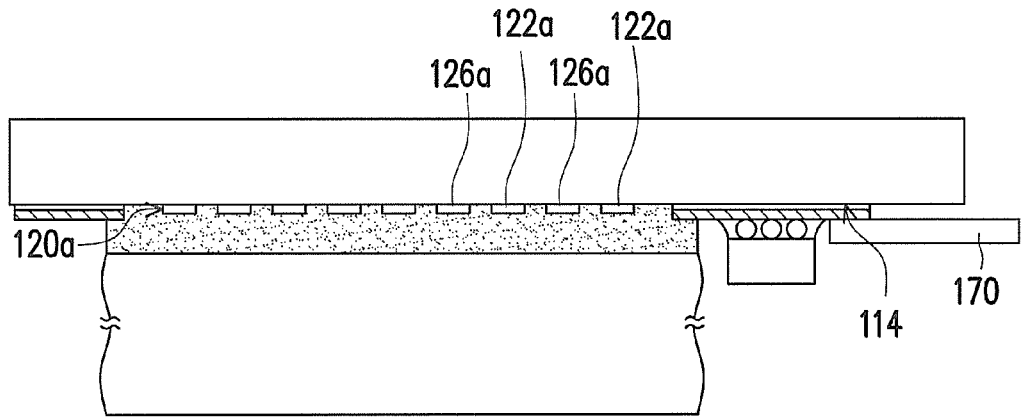
FIG. 2A illustrates a cross-sectional view of a different structure of the touch panel in FIG. 1A.
Figure 2B:
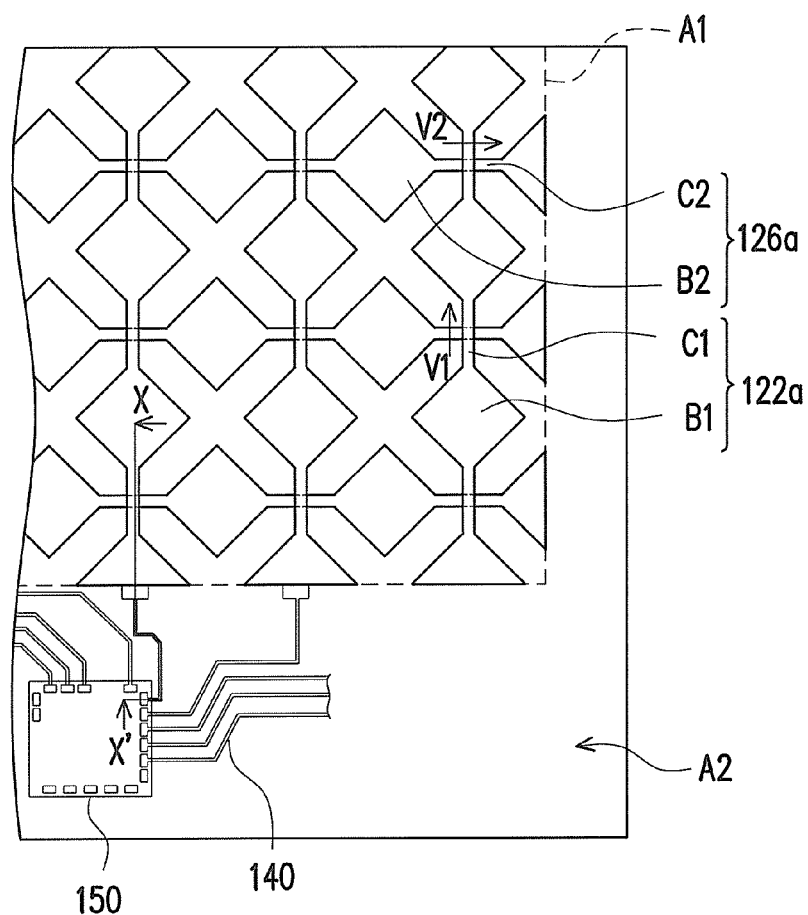
FIG. 2B illustrates a partial top view of the transparent region of the touch panel in FIG. 2A.

FIG. 1A illustrates a cross-sectional view showing a touch panel disposed on a display panel according to an embodiment of the invention, and FIG. 1B illustrates a partial top view of the transparent region of the touch panel in FIG. 1A. FIG. 2A illustrates a cross-sectional view of a different structure of the touch panel in FIG. 1A, and FIG. 2B illustrates a partial top view of the transparent region of the touch panel in FIG. 2A.

Referring to FIGS. 1A and 1B, the touch panel 100 of the present embodiment has a transparent region A1 and a peripheral region A2 surrounding the transparent region A1, wherein the peripheral region A2 is exemplified as a non-transparent region. In the touch panel 100, the transparent elements such as the transparent touch electrodes are disposed in the transparent region A1, and the non-transparent elements such as the touch chips and the conductive layers having the transmitting lines are disposed in the peripheral region A2 so that the non-transparent elements are prevented from negatively influencing on the visual effect when a user views the touch panel 100.

The touch panel 100 includes a transparent cover 110, a touch device 120, a light-shielding layer 130, a layer of conductive lines 140, and a touch chip 150. The transparent cover 110 has a touch surface 112 and a device mounting surface 114 opposite thereto, wherein the touch surface 112 serves a surface to be directly touched by the user for operating the touch panel 100. The light-shielding layer 130 is disposed on the transparent cover 114 and located inside the peripheral region A2. In the present embodiment, the thickness T1 of the light-shielding layer 130 is ranged from 0.5 μm to 6 μm. A material of the light-shielding layer 130 includes non-transparent materials such as resin, and in an embodiment, the non-transparent resin can be a black resin or a white resin. The layer of conductive lines 140 is disposed on the light-shielding layer 130 and the conductive lines in the layer 140 can be metal such as Cr, Al, Cu, Mo, Mo/Al alloy, Ti, Ti/Al alloy, Ag, Ag/Pd alloy, or a combination thereof.

The touch device 120 is disposed on the device mounting surface 114, located inside the transparent region A1, and electrically connected to the layer of conductive lines 140. In the present embodiment, the touch device 120 includes a plurality of first touch electrodes 122, an insulator layer 124, and a plurality of second touch electrodes 126. The first touch electrodes 122 are disposed on the device mounting surface 114 along a first direction V1. The insulator layer 124 is disposed on the device mounting surface 114 to cover the first touch electrodes 122. The second touch electrodes 126 are disposed on a surface 124a of the insulator layer 124 away from the first touch electrodes 122 along a second direction V2 perpendicular to the first direction V1. In addition, the first touch electrodes 122 are partially overlapped the second touch electrodes 126. The first touch electrodes 122 and the second touch electrodes 126 are exemplified as band-like electrodes. In the present embodiment, the layer of conductive lines 140 can have a plurality of conductive lines (not shown), and each first touch electrode 122 is electrically connected to the corresponding conductive line. Each second touch electrode 126 is also electrically connected to the corresponding conductive line.

The first touch electrodes 122 and the second touch electrodes 126 can be made of a transparent conductive material, such as indium tin oxide (ITO), cadmium tin oxide (CTO), aluminum zinc oxide (AZO), indium zinc oxide (IZO), zinc oxide (ZnO), tin oxide (SnO), or a combination thereof.

It is noted that the touch device 120 is directly formed on the transparent cover 110 in the present embodiment, and thus no extra substrate is required to be disposed between the touch device 120 and the transparent cover 110 so that the total volume and the manufacturing cost of the touch panel 100 are reduced. In other embodiments, the first touch electrodes 122a and the second touch electrodes 126a can be disposed respectively on two opposite substrates.

The touch chip 150 is directly bonded on the layer of conductive lines 140 through a chip-on-glass process, wherein an anisotropic conductive film (ACF) I is disposed between the touch chip 150 and the layer of conductive lines 140. The ACF I has a glue layer G and a plurality of conductive particles 160 distributed in the glue layer G, and the touch chip 150 is electrically connected to the layer of conductive lines 140 through the conductive particles 160 of the ACF I.

It is noted that the light-shielding layer 130 may be caved in due to the pressure generating during the process of bonding the touch chip 150 on the layer of conductive lines 140. Once the caving depth is too deep for the conductive particles 160 to firmly connect the layer of conductive lines 140 to the touch chip 150, the connection between the layer of conductive lines 140 and the touch chip 150 is insufficiently reliable. The thickness T1 of the light-shielding layer 130 is reduced in the present embodiment and a diameter D of each conductive particle 160 is larger than the thickness T1 of the light-shielding layer 130 and also larger than the thickness T2 of the layer of conductive lines 140. Accordingly, the diameter D of the conductive particles 160 is large enough to compensate the caving effect of the light-shielding layer 130 during the process of bonding the touch chip 150 to the layer of conductive lines 140. In other words, the conductive particles 160 are firmly connected with the touch chip 150 and the layer of conductive lines 140 simultaneously during the bonding process of the touch chip 150 in the present embodiment, the yield rate is thus improved, and the cost is reduced.

Besides, the touch panel 100 can further includes a flexible printed circuit board 170 in the present embodiment which connects to the margin of the transparent cover 110 and electrically connects the layer of conductive lines 140. Moreover, the touch panel 100 can be disposed on a display panel S, such as a liquid crystal display panel (LCD), a plasma display panel (PDP), an electronic paper display (EPD) panel, or an organic light emitting display (OLED) panel, and the display panel S can be selectively connected to the touch chip 150. When a position of the user's touch on the transparent cover 110 is determined by the touch chip 150, a driving signal can be transmitted to the display panel S through the touch chip 150 so that the display panel S is driven based on the signal to display a corresponding image.

In other embodiments, referring to FIGS. 2A and 2B, the touch device 120a includes a plurality of first touch electrodes 122a and a plurality of second touch electrodes 126a. The first touch electrodes 122a are disposed on the device mounting surface 114 and each first touch electrode 122a extends along the first direction V1, and the second touch electrodes 126a are disposed on the device mounting surface 114 and each second touch electrode 126a extends along the second direction V2, wherein the second touch electrodes 126a are intersecting with the first touch electrodes 122a. Besides, the first direction V1 is perpendicular to the second direction V2. Specifically, the first touch electrodes 122a are electrode series consisting of a plurality of diamond patterns B1 serially connected through a plurality of connecting lines C1 and the second touch electrodes 126a are electrode series consisting of a plurality of diamond patterns B2 serially connected through a plurality of connecting lines C2. It is noted that the diamond patterns B1 and B2 can be coplanar disposed.

In the aforesaid embodiments, the layer of conductive lines 140 is fabricated before the fabrication of the diamond patterns B1 and B2. The layer of conductive lines 140 are generally made of metal material and the diamond patterns B1 and B2 are made of transparent conductive material. Therefore, for the continuity of the lines in the layer of the conductive lines 140, a less-corrosive etching solution must be used in the patterning process for forming the diamond patterns B1 and B2 so that the damage of the layer of conductive lines 140 is prevented. Nevertheless, based on the less-corrosive requirement, the transparent conductive layer including the diamond patterns B1 and B2 are fabricated by using a low temperature process. However, the transparent conductive layer fabricated through the low temperature process has relative poor light transmission characteristic and is not conducive to the application of the touch panel 100. Accordingly, the dispositions of the layer of conductive lines 140 and the diamond patterns B1 and B2 can be shown in FIG. 2C and FIG. 2D to enhance the process yield rate and the quality of the touch panel 100.

Figure 2C:
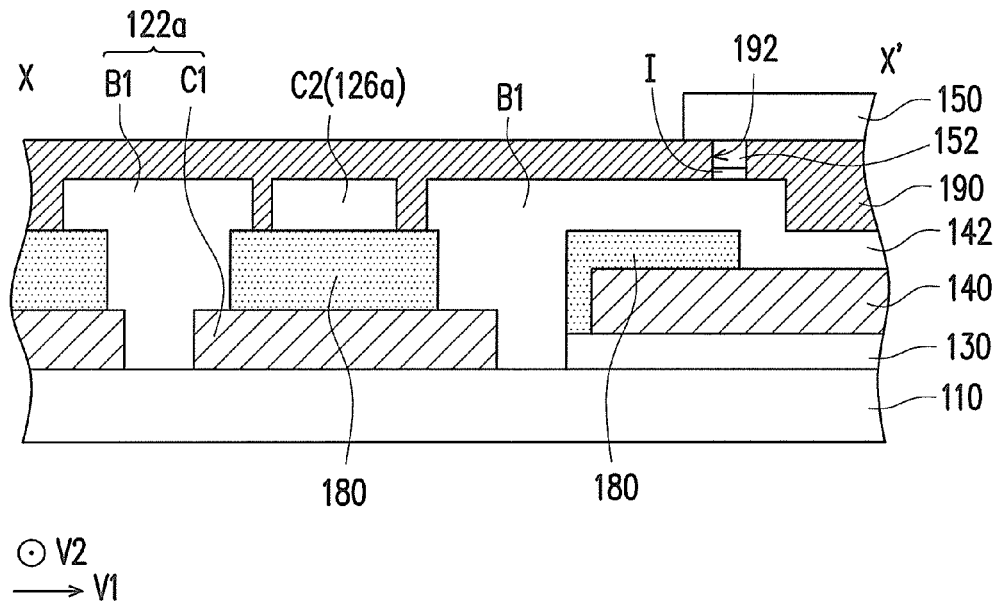
FIG. 2C is a cross-sectional view of the touch panel illustrated along the cross-sectional line X-X' in FIG. 2B.

FIG. 2C is a cross-sectional view of the touch panel illustrated along the cross-sectional line X-X' in FIG. 2B. Referring to FIG. 2C, the transparent cover 110 is configured with the light shielding layer 130, the layer of conductive lines 140, the first touch electrodes 122a, and the second touch electrodes 126a, wherein the first touch electrode 122a is formed by serially connecting of the diamond patterns B1 and the connecting lines C1. The drawing only shows the connecting line C2 of the second touch electrode 126a while the second touch electrode 126a is formed by serially connecting of the diamond patterns (not shown) and the connecting line C2. In addition, the insulating layer 180 is further disposed between the connecting line C1 and the connecting line C2 for the electrically insulation between the connecting lines C1 and the connecting line C2. It is noted that the layer of conductive lines 140 and the connecting lines C1 are made of metal material and the diamond pattern B1 located at the terminal area is extended to the layer of the conductive lines 140 so as to form a plurality of transparent pads 142. That is to say, the layer of conductive lines 140 and the connecting lines C1 are completely covered by the insulating layer and elements made of transparent conductive material. Furthermore, the transparent cover 110 is covered by a passivation layer 190 having a plurality of openings 192 exposing the transparent pads 142. Accordingly, the transparent pads 142 can be electrically connected to a plurality of bumps 152 of the chip 150 through the ACF I.

Specifically, after the formation of the light shielding layer 130, a patterned metal layer including the connecting lines C1 and the layer of conductive lines 140 are subsequently formed. Thereafter, the patterned insulating layer 180 and a patterned transparent conductive layer including the diamond patterns B1 and B2, the connecting lines C2, and the transparent pads 142 are formed. Subsequently, the passivation layer 190 and the openings 192 exposing the transparent pads 142 are fabricated to form the touch panel 100. In the present embodiment, the layer of conductive lines 140 is not exposed during the process for patterning the transparent conductive layer so as to prevent from being damaged by the etching solution. Therefore, a high temperature process can be used to form the transparent conductive layer without damaging the layer of conductive lines 140. Accordingly, the layer of conductive lines 140 has desirable quality and reliability, and the diamond patterns B1 and B2 can have desirable light transmission characteristic.

Figure 2D:
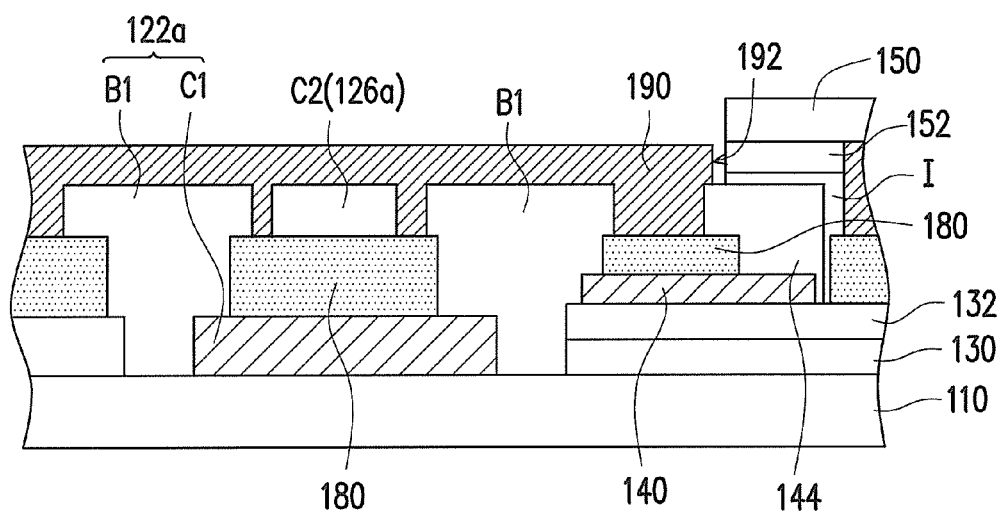
FIG. 2D is another cross-sectional view of the touch panel illustrated along the cross-sectional line X-X' in FIG. 2B.

FIG. 2D is another cross-sectional view of the touch panel illustrated along the cross-sectional line X-X' in FIG. 2B. Referring to FIG. 2D, the difference between FIG. 2C and FIG. 2D lies in that the transparent pads 144 are not directly connected to the diamond pattern B1 located at the terminal area and the openings 192 of the passivation layer 190 substantially exposes the transparent pads 144. It is noted that the layer of conductive layer 140 shown in FIG. 2C and FIG. 2D is completely covered by the patterned transparent conductive layer and the insulating layer 180. Accordingly, the layer of conductive lines 140 is not damaged by the etching solution used for patterning the transparent conductive layer and the transparent conductive layer can be fabricated by using a high temperature process to enhance the light transmission characteristic.

As shown in FIG. 2A, the touch panel 100 of the invention is not restricted to be adhered on the display panel S to form a touch display panel. In other embodiments, a transparent substrate or a protecting layer (not shown) can further be disposed on the device mounting surface 114, wherein the touch device 120 is located between the transparent substrate (or the protecting layer) and the transparent cover 110. That is to say, the touch panel 100 of the present embodiment can be used individually or assembled with other display apparatus such as the display panel S to form a touch display panel.

As described above, for improving the poor reliance of the connection between the touch chip and the layer of conductive lines in the conventional design, the thickness of the light-shielding layer 130 is reduced in the embodiment depicted in FIG. 1A so as to minimize the negative influence caused by the light-shielding layer 130 during the bonding process of the touch chip 150. Accordingly, the layer of conductive lines 140 and the touch chip 150 are steadily electrically connected. Nevertheless, other methods can be adopted for achieving the aforesaid effect, e.g. a material with high hardness can be used to form the light-shielding layer 130 to enhance the supporting property of the light-shielding layer 130 and the embodiment of FIG. 3 is provided to describe the example.

Figure 3:
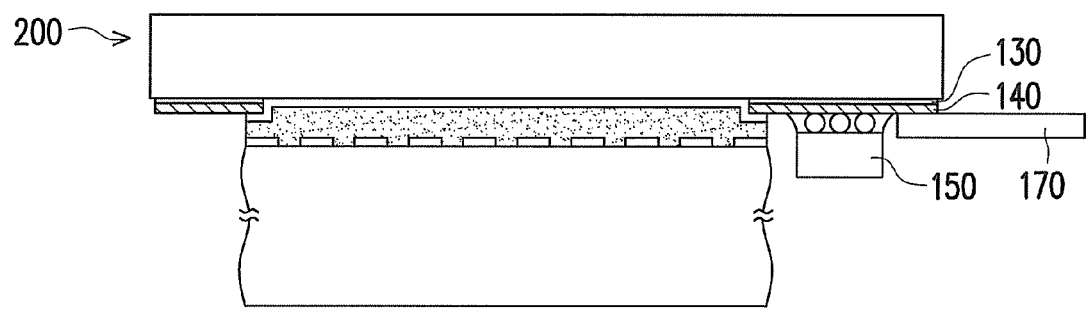
FIG. 3 illustrates a cross-sectional view showing a touch panel disposed on a display panel according to another embodiment of the invention.

FIG. 3 illustrates a cross-sectional view showing a touch panel disposed on a display panel according to another embodiment of the invention. Referring to FIG. 3, the touch panel 200 of the present embodiment is similar to the touch panel 100 in FIG. 1A, and the difference between the two touch panels lies mainly in that the material of the light-shielding layer 130 in touch panel 200 is diamond-like carbon. Generally, the diamond-like carbon has high hardness so that the light-shielding layer 130 is difficultly caved in during the bonding process of the touch chip 130 if the light-shielding layer 130 is made of the diamond-like carbon. Accordingly, the manufacturing yield rate is enhanced and the cost can be decreased. In the present embodiment, the material of the layer of conductive lines 140 includes Al, Cu, Mo, Mo/Al alloy, Ti, Ti/Al alloy, Ag, Ag/Pd alloy or any combination of the foregoing.

In addition, the diamond-like carbon has good light-shielding property so that the thickness of the light-shielding layer 130 can be relatively thin while still provides superior light-shielding effect. For example, the thickness of the light-shielding layer 130, e.g. 0.5 µm to 6 µm, can be smaller than the thickness the user's hand can feel, e.g. 0.5 µm to 6 µm. Therefore, in addition to be disposed on the device mounting surface 114, the light-shielding layer 130 can be disposed on the touch surface 112 without generating the feeling of drop on the surface when the user touches the touch panel 200. Herein, FIG. 4A and FIG. 4B are shown to exemplify the embodiment which has the light-shielding layer disposed on the touch surface.

Figure 4A:
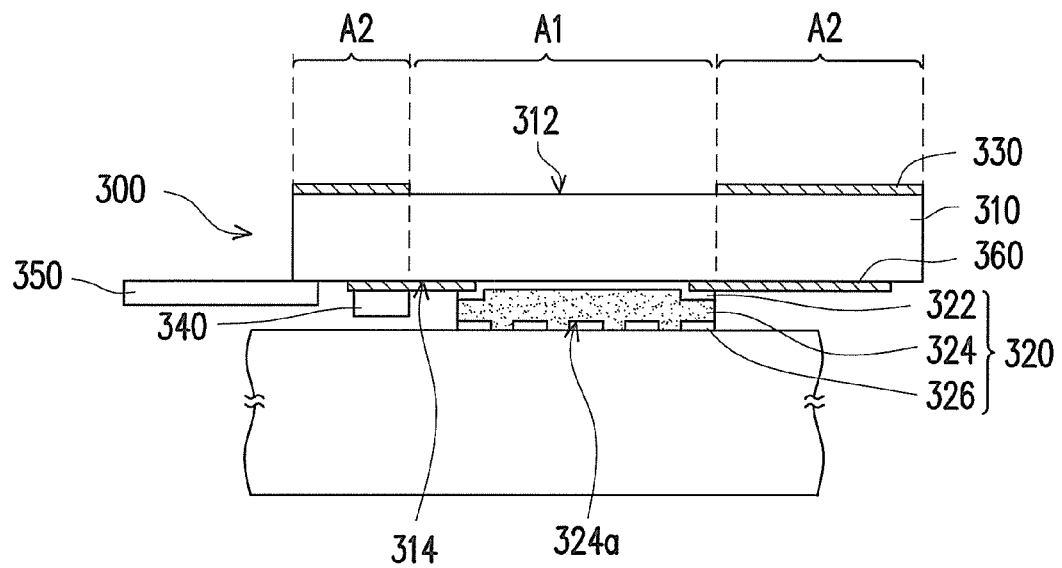
FIG. 4A illustrates a cross-sectional view showing a touch panel disposed on a display panel according to further another embodiment of the invention.
Figure 4B:
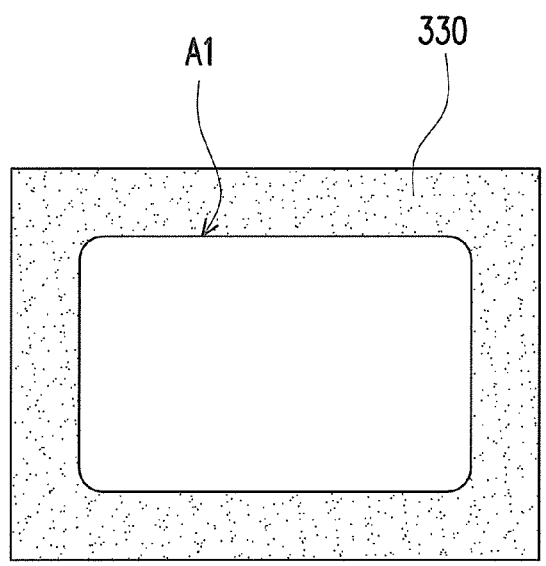
FIG. 4B illustrates a top view of the touch panel of FIG. 4A.
Figure 5:
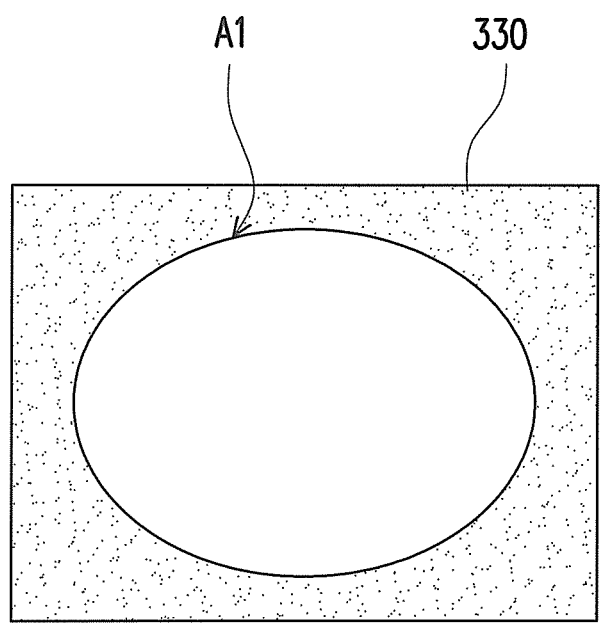
FIG. 5 illustrates a top view of a different structure of the touch panel of FIG. 4B.

FIG. 4A illustrates a cross-sectional view showing a touch panel disposed on a display panel according to further another embodiment of the invention, and FIG. 4B illustrates a top view of the touch panel in FIG. 4A. FIG. 5 illustrates a top view of a different structure of the touch panel in FIG. 4B.

Referring to FIGS. 4A and 4B, the touch panel 300 of the present embodiment has a transparent region A1 and a peripheral region A2 surrounding the transparent region A1. The touch panel 300 includes a transparent cover 310, a touch device 320, a light-shielding layer 330, a touch chip 340, and a layer of conductive lines 360.

The transparent cover 310 has a touch surface 312 and a device mounting surface 314 opposite thereto. The touch device 320 is disposed on the device mounting surface 314 and located at the transparent region A1. The touch chip 340 is disposed on the device mounting surface 314, located inside the peripheral region A2, and electrically connected to the touch device 320.

In the present embodiment, the light-shielding layer 330 can be disposed on the touch surface 312 and located in the peripheral region A2 for shielding the touch chip 340, wherein the material of the light-shielding layer 330 is diamond-like carbon. The diamond-like carbon has dense structure and is very hard so as to provide desirable light-shielding property and abrasion resistance. Accordingly, the light-shielding layer 330 is quite thin while still has good light-shielding effect. When the light-shielding layer 330 is configured on the touch surface 312, no touch feeling of drop on the surface is caused by the light-shielding layer 330 during the user touches the touch panel 300.

Accordingly, the layer of conductive lines 360 can be directly disposed on the device mounting surface 314 in the present embodiment to enhance the manufacturing yield rate of the bonding process of the touch chip 340 and reduce the cost. Moreover, the shape of the light-shielding layer 330 can be changed to form the transparent regions A1 with different shapes as shown in FIGS. 4B and 5.

In summary, the touch device is directly formed on the transparent cover in the present invention, and thus no extra substrate is required to be disposed between the touch device and the transparent cover so that the total volume and the manufacturing cost of the touch panel are reduced. In addition, the total thickness of the light-shielding layer and the layer of conductive lines in the present invention is smaller than the diameter of the conductive particles. Therefore, the diameter of the conductive particles is large enough to ensure the connection between the layer of conductive lines and the touch chip during the chip-on-glass bonding process. Moreover, the light-shielding layer of the invention can be made of hard diamond-like carbon thereby providing sufficient support and high abrasion resistance and capable of being disposed on the device mounting surface or the touch surface. When the material of the light-shielding layer is diamond-like carbon, the thickness of the light-shielding layer is quite thin and still has desirable light-shielding effect. Therefore, the disposition of the light-shielding layer on the touch surface would not cause the touch feeling of drop during the user uses the touch panel.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A touch panel with a transparent region and a peripheral region surrounding the transparent region comprising:
    a transparent cover comprising a touch surface and a device mounting surface opposite thereto;
    a touch device disposed on the device mounting surface and mainly located at the transparent region;
    a light-shielding layer disposed on the transparent cover and located inside the peripheral region, and made of resin with a thickness from 0.5 μm to 6 μm;
    a layer of conductive lines disposed on the device mounting surface, located inside the peripheral region, and electrically connected to the touch device;
    a touch chip disposed on the layer of conductive lines through a chip-on-glass process; and
    an anisotropic conductive film disposed between the layer of conductive lines and the touch chip, wherein the anisotropic conductive film comprises a plurality of conductive particles, and a diameter of each conductive particle is larger than a thickness of the light-shielding layer and the layer of conductive lines.

2. The touch panel of claim 1, wherein the light-shielding layer is disposed on the device mounting surface and sandwiched between the layer of conductive lines and the transparent cover.

3. The touch panel of claim 1, wherein the light-shielding layer is disposed on the touch surface.

4. The touch panel of claim 1, wherein the light-shielding layer is made of diamond-like carbon.

5. The touch panel of claim 1, wherein the light-shielding layer is made of black or white resin.

6. The touch panel of claim 1, wherein the touch device comprises:
    a plurality of first touch electrodes disposed on the device mounting surface wherein each first touch electrode extends along a first direction;
    an insulator layer disposed on the device mounting surface and covering the first touch electrodes; and
    a plurality of second touch electrodes disposed on a surface of the insulator layer away from the first touch electrodes wherein each second touch electrode extends along a second direction substantially perpendicular to the first direction.

7. The touch panel of claim 6, wherein the first touch electrodes and the second touch electrodes are band-like electrodes.

8. The touch panel of claim 6, wherein the first touch electrodes and the second touch electrodes are electrode series consisting of a plurality of diamond patterns.

9. The touch panel of claim 1, wherein the touch device comprises:
    a plurality of first touch electrodes disposed on the device mounting surface wherein each first touch electrode extends along a first direction; and
    a plurality of second touch electrodes disposed on the device mounting surface to intersect the first touch electrodes wherein each second touch electrode extends along a second direction substantially perpendicular to the first direction.

10. The touch panel of claim 9, wherein the first touch electrodes and the second touch electrodes are electrode series consisting of a plurality of diamond patterns.

11. The touch panel of claim 10, wherein the first touch electrodes and the second touch electrodes comprise a plurality of connection pads overlapping the layer of conductive lines.

12. The touch panel of claim 11, wherein the touch chip comprises a plurality of connection bumps electrically connected with the connection pads.

13. The touch panel of claim 1, further comprising:
    a flexible printed circuit board electrically connected to the layer of conductive lines.

* * * * *